US012400795B2

(12) United States Patent
Lee et al.

(10) Patent No.: US 12,400,795 B2
(45) Date of Patent: Aug. 26, 2025

(54) MULTILAYER ELECTRONIC COMPONENT HAVING EXTERNAL ELECTRODE INCLUDING ALLOY LAYER BETWEEN BASE ELECTRODE LAYER AND PLATING LAYER

(71) Applicant: SAMSUNG ELECTRO-MECHANICS CO., LTD., Suwon-si (KR)

(72) Inventors: Chung Yeol Lee, Suwon-si (KR); Cheong Kim, Suwon-si (KR); Jong Rock Lee, Suwon-si (KR); Jun Il Kang, Suwon-si (KR); Hiroki Okada, Suwon-si (KR); Hee Jung Jung, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 100 days.

(21) Appl. No.: 18/222,087

(22) Filed: Jul. 14, 2023

(65) Prior Publication Data
US 2024/0312714 A1    Sep. 19, 2024

(30) Foreign Application Priority Data

Mar. 15, 2023 (KR) .................. 10-2023-0033987

(51) Int. Cl.
*H01G 4/232*    (2006.01)
*H01G 4/30*    (2006.01)

(52) U.S. Cl.
CPC ............ *H01G 4/2325* (2013.01); *H01G 4/30* (2013.01)

(58) Field of Classification Search
None
See application file for complete search history.

(56) References Cited

U.S. PATENT DOCUMENTS

| 2015/0085422 A1* | 3/2015 | Kim ................. H01G 4/2325 156/89.18 |
| 2016/0379758 A1* | 12/2016 | Otani ............... H01G 4/2325 361/301.4 |
| 2020/0082987 A1 | 3/2020 | Lee et al. |
| 2020/0203720 A1 | 6/2020 | Shiode |
| 2021/0193386 A1 | 6/2021 | Dozen et al. |

FOREIGN PATENT DOCUMENTS

| JP | 2020-102548 A | 7/2020 |
| JP | 2021-100019 A | 7/2021 |
| KR | 10-2019-0121174 A | 10/2019 |

* cited by examiner

*Primary Examiner* — Eric W Thomas
(74) *Attorney, Agent, or Firm* — Morgan Lewis & Bockius LLP (57) ABSTRACT

A multilayer electronic component includes a body including a dielectric layer and an internal electrode; and an external electrode including a base electrode layer disposed on the body and including a first metal element, and an alloy layer and a plating layer, sequentially disposed on the base electrode layer. The alloy layer includes a first alloy layer disposed to contact the base electrode layer and including an alloy of the first metal element and Sn, and a second alloy layer disposed to contact the first alloy layer and including an alloy of Ni and Sn, and the plating layer includes an Ni plating layer disposed to contact the second alloy layer.

25 Claims, 6 Drawing Sheets

MULTILAYER ELECTRONIC COMPONENT HAVING EXTERNAL ELECTRODE INCLUDING ALLOY LAYER BETWEEN BASE ELECTRODE LAYER AND PLATING LAYER

CROSS-REFERENCE TO RELATED APPLICATION (S)

This application claims benefit of priority to Korean Patent Application No. 10-2023-0033987 filed on Mar. 15, 2023 in the Korean Intellectual Property Office, the disclosure of which is incorporated herein by reference in its entirety.

TECHNICAL FIELD

The present disclosure relates to a multilayer electronic component.

A multilayer ceramic capacitor (MLCC), a multilayer electronic component, may be a chip-type condenser mounted on the printed circuit boards of any of various types of electronic products, such as an image display device, including a liquid crystal display (LCD), a plasma display panel (PDP), or the like, a computer, a smartphone, or a mobile phone, serving to charge or discharge electricity therein or therefrom.

The multilayer ceramic capacitor has a small size, implements high capacitance, and is easily mounted, and may thus be used as a component of various electronic devices.

In general, an external electrode of a multilayer ceramic capacitor may include a base electrode layer, an Ni plating layer disposed on the base electrode layer, and an Sn plating layer disposed on the Ni plating layer.

When the multilayer ceramic capacitor is mounted on a substrate, tensile stress or physical stress caused by heat generated during a reflow process may be applied to the multilayer ceramic capacitor. In this case, an interface between the base electrode layer and the Ni plating layer, a portion having weak adhesion, may be peeled off.

In order to solve this problem, Patent Document 1 has tried to improve adhesion between the base electrode layer and the Ni plating layer by forming an Ni—Sn alloy plating layer between the base electrode layer and the Ni plating layer.

However, since it is difficult to improve adhesion between the base electrode layer and the Ni—Sn alloy plating layer only by forming the Ni—Sn alloy plating layer, a new method is required.

(Patent Document 1) JP 2021-100019 A

SUMMARY

An aspect of the present disclosure is to provide a multilayer electronic component having improved adhesion between a base electrode layer and an Ni plating layer.

An object of the present disclosure is not limited to the above, and will be more easily understood in the process of describing specific embodiments of the present disclosure.

According to an aspect of the present disclosure, a multilayer electronic component includes a body including a dielectric layer and an internal electrode; and an external electrode including a base electrode layer disposed on the body and including a first metal element, and an alloy layer and a plating layer, sequentially disposed on the base electrode layer. The alloy layer includes a first alloy layer disposed to contact the base electrode layer and including an alloy of the first metal element and Sn, and a second alloy layer disposed to contact the first alloy layer and including an alloy of Ni and Sn, and the plating layer includes an Ni plating layer disposed to contact the second alloy layer.

According to an aspect of the present disclosure, a multilayer electronic component includes a body including a dielectric layer and an internal electrode; and an external electrode including a base electrode layer disposed on the body and including a first metal element, and an alloy layer and a Ni plating layer, sequentially disposed on the base electrode layer. The alloy layer includes an alloy of the first metal element, Sn, and Ti. An average thickness of the alloy layer is 0.2 µm or less.

BRIEF DESCRIPTION OF DRAWINGS

The above and other aspects, features, and advantages of the present disclosure will be more clearly understood from the following detailed description, taken in conjunction with the accompanying drawings.

DETAILED DESCRIPTION

Hereinafter, embodiments of the present disclosure will be described with reference to specific example embodiments and the attached drawings. The embodiments of the present disclosure may, however, be exemplified in many different forms and should not be construed as being limited to the specific embodiments set forth herein. The example embodiments disclosed herein are provided for those skilled in the art to better explain the present disclosure. In the drawings, the shapes and dimensions of elements may be exaggerated for clarity, and the same reference numerals will be used throughout to designate the same or like elements.

In addition, in order to clearly describe the present disclosure in the drawings, the contents unrelated to the description are omitted, and since sizes and thicknesses of each component illustrated in the drawings are arbitrarily illustrated for convenience of description, the present disclosure is not limited thereto. In addition, components with the same function within the same range of ideas are described using the same reference numerals. Throughout the specification, when a certain portion "includes" or "comprises" a certain component, this indicates that other components are not excluded and may be further included unless otherwise noted.

In the drawings, a first direction may be defined as a thickness T direction, a second direction may be defined as a length L direction, and a third direction may be defined as a width W direction.

Multilayer Electronic Component

Figure 1:
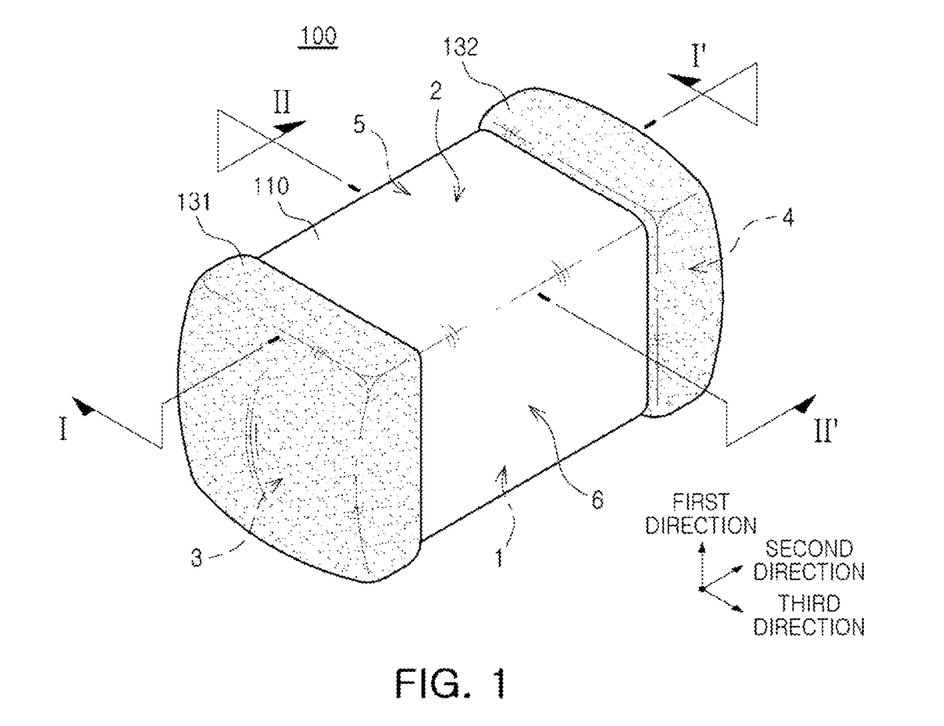
FIG. 1 is a perspective view schematically illustrating a multilayer electronic component according to an embodiment of the present disclosure.

FIG. 1 is a perspective view schematically illustrating a multilayer electronic component according to an embodiment of the present disclosure.

Figure 2:
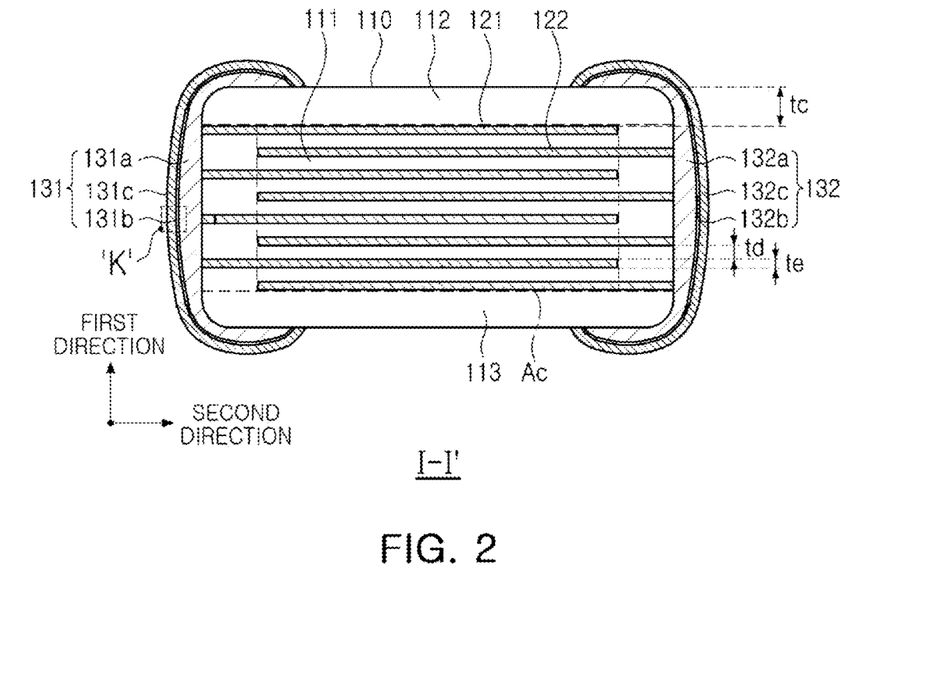
FIG. 2 is a cross-sectional view schematically illustrating the multilayer electronic component of FIG. 1, taken along line I-I'.

FIG. 2 is a cross-sectional view schematically illustrating the multilayer electronic component of FIG. 1, taken along line I-I'.

Figure 3:
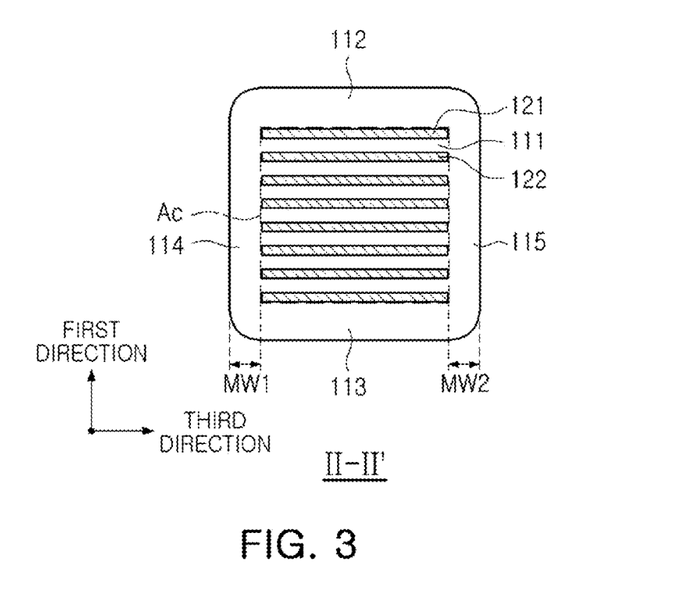
FIG. 3 is a cross-sectional view schematically illustrating the multilayer electronic component of FIG. 1, taken along line II-II'.

FIG. 3 is a cross-sectional view schematically illustrating the multilayer electronic component of FIG. 1, taken along line II-II'.

Figure 4:
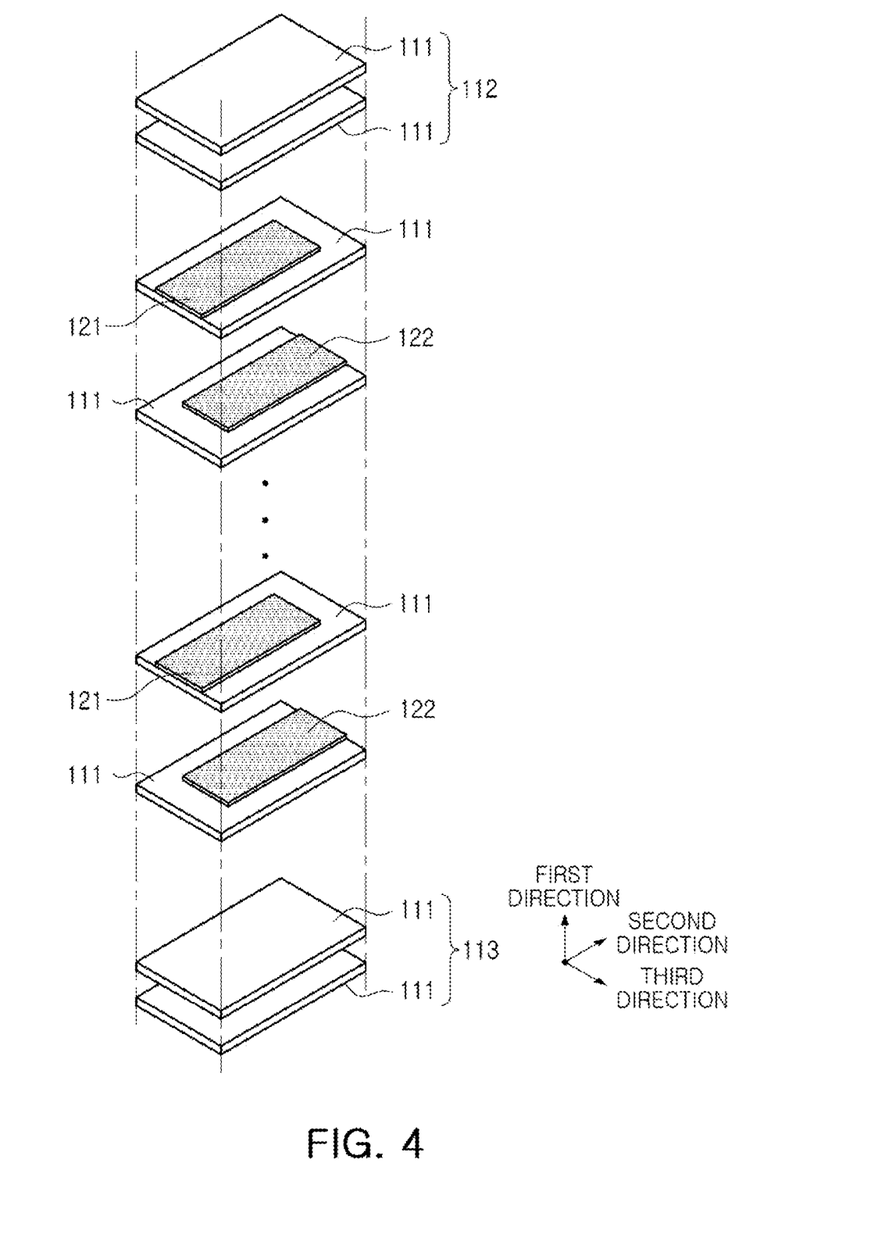
FIG. 4 is an exploded perspective view schematically illustrating a body.

FIG. 4 is an exploded perspective view schematically illustrating a body.

Figure 5:
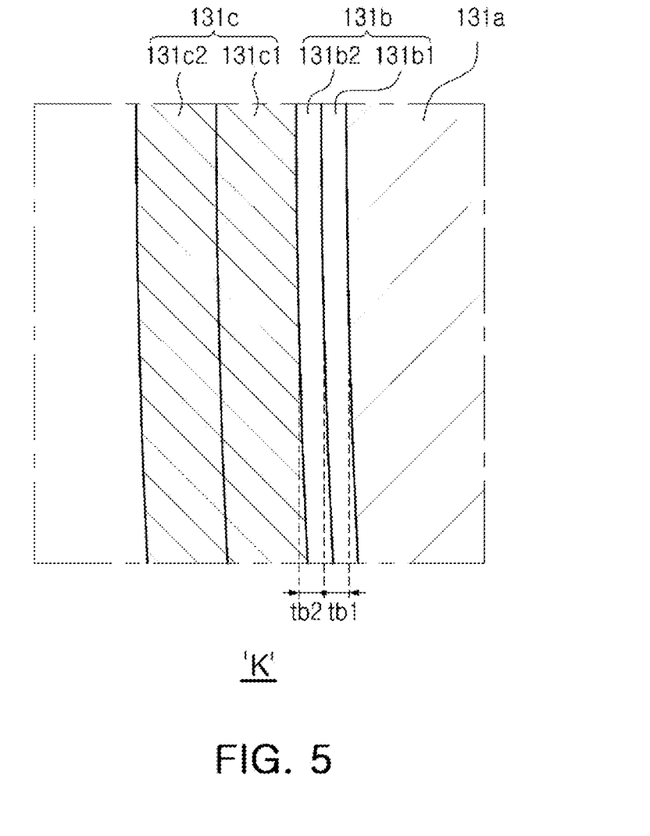
FIG. 5 is an enlarged view of portion K of FIG. 2.

FIG. 5 is an enlarged view of portion K of FIG. 2.

Hereinafter, a multilayer electronic component 100 according to an embodiment of the present disclosure will be described in detail with reference to FIGS. 1 to 5. In addition, multilayer ceramic capacitor (hereinafter referred to as 'MLCC') will be described as an example of the multilayer electronic component, but the present disclosure is not limited thereto, and may be applied to various multilayer electronic components having an external electrode, such as an inductor, a piezoelectric element, a varistor, a thermistor, or the like.

A multilayer electronic component 100 according to an embodiment of the present disclosure may include a body 110 including a dielectric layer 111 and an internal electrode (121 and 122); an external electrode (131 and 132) including a base electrode layer (131a and 132a) disposed on the body and including a first metal element, an alloy layer (131b and 132b) disposed on the base electrode layer, and a plating layer (131c and 132c) disposed on the alloy layer (131b and 132b). The alloy layer (131b) may include a first alloy layer (131b1) disposed to contact the base electrode layer (131a) and including an alloy of the first metal element and Sn, and a second alloy layer (131b2) disposed to contact the first alloy layer and including an alloy of Ni and Sn. The plating layer 131c may include an Ni plating layer (131c1) disposed to contact the second alloy layer (131b2). The alloy layer (132b) may be configured similar to the alloy layer (131b) to have a first alloy layer disposed to contact the base electrode layer (132a) and including an alloy of the first metal element and Sn, and a second alloy layer disposed to contact the first alloy layer and including an alloy of Ni and Sn. The plating layer (132c) may be configured similar to the plating layer (131c) and may include an Ni plating layer disposed to contact the second alloy layer of the alloy layer (132b). The detailed structure of the alloy layer (132b) and the plating layer (132c), and the layers/materials constituting the alloy layer (132b) and the plating layer (132c) may be respectively referred to the alloy layer (131b) and the plating layer (131c), and thus, the redundant descriptions will be omitted.

As described above, when the multilayer ceramic capacitor, which is a multilayer electronic component, is mounted on a substrate, tensile stress or physical stress caused by heat generated during a reflow process may be applied to the multilayer ceramic capacitor. In this case, an interface between the base electrode layer and the Ni plating layer, which is a portion having weak adhesion, may be peeled off.

In order to solve this problem, a method of improving adhesion between a base electrode layer and an Ni plating layer by forming an Ni—Sn alloy plating layer between the base electrode layer and the Ni plating layer has been proposed. In this case, adhesion may be improved, as compared to a case in which the Ni—Sn alloy plating layer is not provided, but there may be a limit in improving adhesion between the Ni—Sn alloy plating layer and the base electrode layer. In addition, since a composition of the Ni—Sn alloy plating layer may be clearly changed on an interface with the base electrode layer and an interface with the Ni plating layer, an effect of improving the adhesion may be limited. On an interface between heterogeneous metals, as compositions thereof are similar to each other, adhesion therebetween may increase. When the Ni—Sn alloy plating layer is formed on the base electrode layer, since compositions thereof may be rapidly changed on an interface between the base electrode layer and the Ni—Sn alloy plating layer, adhesion therebetween may decrease.

Therefore, since the present disclosure includes the first alloy layer (131b1) disposed to contact the base electrode layer (131a) and including the alloy of the first metal element and Sn, and the second alloy layer (131b2) disposed to contact the first alloy layer (131b1) and including the alloy of Ni and Sn, adhesion between the alloy layer (131b1) and the base electrode layer (131a) and adhesion between the alloy layer (131b1 and 131b2) and the Ni plating layer (131c1) may be improved at the same time, to improve adhesion between the base electrode layer (131a) and the Ni plating layer (131c1). For example, in the present disclosure, it is intended to improve adhesion between heterogeneous layers by making compositions of each other as similar as possible on an interface between the heterogeneous layers.

Hereinafter, each component included in a multilayer electronic component 100 according to an embodiment of the present disclosure will be described.

In the body 110, the dielectric layer 111 and the internal electrode (121 and 122) may be alternately stacked.

Although the specific shape of the body 110 is not particularly limited, as illustrated, the body 110 may have a hexahedral shape or a shape similar thereto. Due to shrinkage of ceramic powder particles included in the body 110 during a sintering process, the body 110 may not have a perfectly straight hexahedral shape, but may have a substantially hexahedral shape.

The body 110 may include first and second surfaces 1 and 2 opposing each other in the first direction, third and fourth surfaces 3 and 4 connected to the first and second surfaces 1 and 2 and opposing each other in the second direction, and fifth and sixth surfaces 5 and 6 connected to the first and second surfaces 1 and 2, connected to the third and fourth surfaces 3 and 4, and opposing each other in the third direction.

As a margin region on which the internal electrode (121 and 122) is not disposed to overlap the dielectric layer 111, a step difference may be generated due to a thickness of the internal electrode (121 and 122), such that a corner connecting the first surface and the third to fifth surfaces and/or a corner connecting the second surface and the third to fifth surfaces have a shape contracted toward a center of the body 110 in the first direction, when viewed from the first surface or the second surface. Alternatively, due to contract behavior of the body during a sintering process, a corner connecting the first surface 1 and the third to sixth surfaces 3, 4, 5, and 6 and/or a corner connecting the second surface 2 and the third to sixth surfaces 3, 4, 5, and 6 may have a shape contracted toward the center of the body 110 in the first direction, when viewed from the first or second surface. Alternatively, to prevent a chipping defect or the like, edges connecting each surface of the body 110 may be rounded by performing a separate process, such that a corner connecting the first surface and the third to sixth surfaces and/or a corner connecting the second surface and the third to sixth surfaces may have a round shape.

To suppress the step difference caused by the internal electrode (121 and 122), after stacking, the internal electrodes may be cut to be exposed from the fifth and sixth surfaces 5 and 6 of the body, and, when a margin portion (114 and 115) is formed by stacking a single dielectric layer or two or more dielectric layers on both side surfaces of a capacitance formation portion Ac in the third direction (width direction), a portion connecting the first surface 1 and the fifth and sixth surfaces 5 and 6 and a portion connecting the second surface 2 and the fifth and sixth surfaces 5 and 6 may not have a contracted shape.

A plurality of dielectric layers 111 forming the body 110 may be in a sintered state, and a boundary between adjacent dielectric layers 111 may be integrated to such an extent that it is difficult to identify the same without using a scanning electron microscope (SEM). The number of stacked dielectric layers is not particularly limited, and may be determined in consideration of a size of the multilayer electronic component. For example, the body may be formed by stacking 400 or more dielectric layers.

The dielectric layer 111 may be prepared by forming a ceramic slurry containing ceramic powder particles, an organic solvent, and a binder, coating and drying the slurry on a carrier film to prepare a ceramic green sheet, and then sintering the ceramic green sheet. The ceramic powder particles are not particularly limited as long as sufficient capacitance is obtained, but, for example, barium titanate-based ($BaTiO_3$)-based powder particles may be used as the ceramic powder particles. For more specific examples, the ceramic powder particles may be any one of $BaTiO_3$, $(Ba_{1-x}Ca_x)TiO_3$ ($0<x<1$), $Ba(Ti_{1-y}Ca_y)O_3$ ($0<y<1$), $(Ba_{1-x}Ca_x)(Ti_{1-y}Zr_y)O_3$ ($0<x<1$, $0<y<1$), or $Ba(Ti_{1-y}Zr_y)O_3$ ($0<y<1$).

An average thickness td of the dielectric layer 111 is not particularly limited, but may be, for example, 10 µm or less. In addition, the average thickness td of the dielectric layer 111 may be arbitrarily set according to desired characteristics or uses. In addition, to more easily achieve miniaturization and high capacitance of the multilayer electronic component, the average thickness td of the dielectric layer 111 may be 0.4 µm or less.

In this case, the average thickness td of the dielectric layer 111 means a size of the dielectric layer 111 disposed between the internal electrodes 121 and 122 in the first direction. The average thickness of the dielectric layer 111 may be measured by scanning an image of a cross-section of the body 110 in the first and second directions with a scanning electron microscope (SEM) at a magnification of 10,000. More specifically, an average value thereof may be determined by measuring a thickness of one (1) dielectric layer at thirty (30) equally spaced points in the second direction in the scanned image. The thirty (30) equally spaced points may be designated in the capacitance formation portion Ac, which will be described later. In addition, when such an average value is determined by extensively using measurements of average values to ten (10) dielectric layers, the average thickness of the dielectric layer 111 may be more generalized.

The body 110 may include a capacitance formation portion Ac disposed in the body 110 and including a first internal electrode 121 and a second internal electrode 122 disposed to face each other with the dielectric layer 111 interposed therebetween to form capacitance, and cover portions 112 and 113 formed above and below the capacitance formation portion Ac in the first direction.

In addition, the capacitance formation portion Ac may be a portion contributing to capacitance formation of the capacitor, and may be formed by repeatedly stacking the plurality of first and second internal electrodes 121 and 122 with the dielectric layer 111 interposed therebetween.

The cover portions 112 and 113 may include an upper cover portion 112 disposed above the capacitance formation portion Ac in the first direction, and a lower cover portion 113 disposed below the capacitance formation portion Ac in the first direction.

The upper cover portion 112 and the lower cover portion 113 may be formed by stacking a single dielectric layer or two or more dielectric layers on the upper and lower surfaces of the capacitance formation portion Ac in the thickness direction, respectively, and may basically play a role in preventing damage to the internal electrodes due to physical or chemical stress.

The upper cover portion 112 and the lower cover portion 113 may not include internal electrodes, and may include the same material as the dielectric layer 111.

For example, the upper cover portion 112 and the lower cover portion 113 may include a ceramic material, for example, a barium titanate ($BaTiO_3$)-based ceramic material.

A thickness of each of the cover portions 112 and 113 does not need to be particularly limited. A thickness tc of each of the cover portions 112 and 113 may be 15 µm or less to more easily achieve miniaturization and high capacitance of the multilayer electronic component.

An average thickness tc of each of the cover portions 112 and 113 may mean a size in the first direction, and may be an average value of sizes in the first direction, measured at five (5) equally spaced points above or below the capacitance formation portion Ac.

In addition, margin portions 114 and 115 may be disposed on side surfaces of the capacitance formation portion Ac.

The marginal portions 114 and 115 may include a first marginal portion 114 disposed on the fifth surface 5 of the body 110, and a second marginal portion 115 disposed on the sixth surface 6 of the body 110. For example, the margin portions 114 and 115 may be disposed on both end surfaces of the body 110 in the width direction.

As illustrated in FIG. 3, the margin portions 114 and 115 may refer to regions between both ends of the first and second internal electrodes 121 and 122 and a boundary surface of the body 110, in a cross-section of the body 110 cut in the width-thickness (W-T) directions.

The margin portions 114 and 115 may basically serve to prevent damage to the internal electrodes due to physical or chemical stress, respectively.

The margin portions 114 and 115 may be prepared by forming internal electrodes by applying a conductive paste on a ceramic green sheet, except for regions in which the margin portions are formed.

In addition, to suppress a step difference caused by the internal electrodes 121 and 122, the margin portions 114 and 115 may be cut to expose the fifth and sixth surfaces 5 and 6 of the body after stacking, respectively, and may be then formed by stacking a single dielectric layer or two or more dielectric layers in the third direction (width direction) on both end surfaces of the capacitance formation portion Ac.

Widths of the margin portions 114 and 115 are not particularly limited. An average width of each of the margin portions 114 and 115 may be 15 μm or less to more easily achieve miniaturization and high capacitance of the multilayer electronic component.

The average width of each of the margin portions 114 and 115 may mean an average size MW1 of each of the margin portions 114 and 115 in the third direction, in a region in which the internal electrode is spaced apart from the fifth surface, and an average size MW2 of each of the margin portions 114 and 115 in the third direction, in a region in which the internal electrode is spaced apart from the sixth surface, respectively, and may be an average value of sizes of each of the margin portions 114 and 115 in the third direction, measured at five (5) equally spaced points on a side surface of the capacitance formation portion Ac.

Therefore, in an embodiment, the average sizes MW1 and MW2 in the regions in which the internal electrodes 121 and 122 are spaced apart from the fifth and sixth surfaces in the third direction may be 15 μm or less, respectively.

The internal electrode (121 and 122) may include first and second internal electrodes 121 and 122. The first and second internal electrodes 121 and 122 may be alternately disposed to face each other with the dielectric layer 111, constituting the body 110, interposed therebetween, and may be exposed from the third and fourth surfaces 3 and 4 of the body 110, respectively.

The first internal electrode 121 may be spaced apart from the fourth surface 4 and be exposed from (or extend from or be in contact with) the third surface 3, and the second internal electrode 122 may be spaced apart from the third surface 3 and exposed from (or extend from or be in contact the fourth surface 4. A first external electrode 131 may be disposed on the third surface 3 of the body and connected to the first internal electrode 121, and a second external electrode 132 may be disposed on the fourth surface 4 of the body and connected to the second internal electrode 122.

For example, the first internal electrode 121 may be connected to the first external electrode 131 without being connected to the second external electrode 132, and the second internal electrode 122 may be connected to the second external electrode 132 without being connected to the first external electrode 131. Therefore, the first internal electrode 121 may be formed to be spaced apart from the fourth surface 4 by a predetermined distance, and the second internal electrode 122 may be formed to be spaced apart from the third surface 3 by a predetermined distance. Also, the first and second internal electrodes 121 and 122 may be spaced apart from the fifth and sixth surfaces of the body 110.

A conductive metal included in the internal electrode (121 and 122) may be at least one of Ni, Cu, Pd, Ag, Au, Pt, In, Sn, Al, Ti, or alloys thereof, but the present disclosure is not limited thereto.

A method of forming the internal electrode (121 and 122) is not particularly limited. For example, the internal electrode (121 and 122) may be formed by applying a conductive paste for internal electrodes containing a conductive metal on a ceramic green sheet and sintering the same. As a method of applying the conductive paste for internal electrodes, a screen printing method, a gravure printing method, or the like may be used, but the present disclosure is not limited thereto.

As another example, the internal electrode (121 and 122) may be formed using a sputtering method, a vacuum deposition method, and/or a chemical vapor deposition method.

An average thickness te of the internal electrode does not need to be particularly limited. In this case, a thickness of the internal electrode (121 and 122) may mean a size of the internal electrode (121 and 122) in the first direction. For example, the average thickness te of the internal electrode (121 and 122) may be 0.4 μm or less to more easily achieve miniaturization and high capacitance of the multilayer electronic component.

In this case, the average thickness te of the internal electrode may be measured by scanning an image of a cross-section of the body 110 in the first and second directions with a scanning electron microscope (SEM) at a magnification of 10,000. More specifically, an average value thereof may be determined by measuring a thickness of one (1) internal electrode at thirty (30) equally spaced points in the second direction in the scanned image. The thirty (30) equally spaced points may be designated in the capacitance formation portion Ac. In addition, when such an average value is determined by extensively using measurements of average values to ten (10) internal electrodes, the average thickness of the internal electrode may be further generalized.

The external electrodes 131 and 132 may be disposed on the third and fourth surfaces 3 and 4 of the body 110.

The external electrodes 131 and 132 may be disposed on the third and fourth surfaces 3 and 4 of the body 110, respectively, and may include first and second external electrodes 131 and 132 respectively connected to the first and second internal electrodes 121 and 122.

In the present embodiment, a structure in which the multilayer electronic component 100 has two external electrodes 131 and 132 will be described, but the number, shapes, and the like of the external electrodes 131 and 132 may depend on shapes of the internal electrodes 121 and 122, and may be changed for other purposes.

The external electrode (131 and 132) may include the base electrode layer (131a and 132a) disposed on the body 110 and including the first metal element, the alloy layer (131b and 132b) disposed on the base electrode layer, and the plating layer (131c and 132c) disposed on the alloy layer.

The alloy layer (131b) may include the first alloy layer (131b1) disposed to contact the base electrode layer (131a) and including the alloy of the first metal element and Sn, and the second alloy layer (131b2) disposed to contact the first alloy layer (131b1) and including the alloy of Ni and Sn, and the plating layer (131c) may include an Ni plating layer (131c1) disposed to contact the second alloy layer (131b2). For example, the external electrode (131) may have a structure in which the base electrode layer (131a), the first alloy layer (131b1), the second alloy layer (131b2), and the Ni plating layer (131c1) are sequentially arranged.

The first alloy layer (131b1) may include the alloy of the first metal element and Sn to improve adhesion to the base electrode layer (131a) including the first metal element, and the second alloy layer 131b2) may include the alloy of Ni and Sn to improve adhesion to the Ni plating layer (131c1).

In addition, the first alloy layer (131b1) and the second alloy layer (131b2) may include Sn in common to improve adhesion between the first alloy layer (131b1) and the second alloy layer (131b2).

In an embodiment, a first metal element amount of the first alloy layer (131b1) may be highest on an interface with the base electrode layer (131a), and may be lowest on an interface with the second alloy layer (131b2). Therefore, adhesion on an interface between the first alloy layer (131b1) and the base electrode layer (131a) may be further improved, and the adhesion may be further improved by making a composition of the first alloy layer (131b1) and a composition of the second alloy layer (131b2) as similar as possible on an interface between the first alloy layer (131b1) and the second alloy layer (131b2).

More preferably, the first metal element amount of the first alloy layer (131b1) may decrease from the interface with the base electrode layer (131a) toward the interface with the second alloy layer (131b2). As the first metal element amount of the first alloy layer (131b1) continuously changes, adhesion between the base electrode layer (131a) and the second alloy layer (131b2) may be further improved.

In an embodiment, an Ni amount of the second alloy layer (131b2) may be highest on an interface with the Ni plating layer (131c1), and may be lowest on an interface with the first alloy layer (131b1). Therefore, adhesion on an interface between the second alloy layer (131b2) and the first alloy layer (131b1) may be further improved, and the adhesion may be further improved by making a composition of the second alloy layer (131b2) and a composition of the Ni plating layer (131c1) as similar as possible on an interface between the second alloy layer (131b2) and the Ni plating layer (131c1).

More preferably, the Ni amount of the second alloy layer (131b2) may decrease from the interface with the Ni plating layer (131c1) toward the interface with the first alloy layer (131b1). As the Ni amount of the second alloy layer (131b2) continuously changes, adhesion between the first alloy layer (131b1) and the Ni plating layer (131c1) may be further improved.

In an embodiment, a first metal element amount of the alloy layer (131b) may be highest on an interface with the base electrode layer (131a), and may be lowest on an interface with the Ni plating layer (131c1). An Ni amount of the alloy layer (131b) may be lowest on an interface with the base electrode layer (131a), and may be highest on an interface with the Ni plating layer (131c1). Therefore, the adhesion may be further improved by making a composition of the alloy layer (131b and 132b) and a composition of the base electrode layer (131a and 132a) as similar as possible on an interface between the alloy layer (131b and 132b) and the base electrode layer (131a and 132a), and by making a composition of the alloy a layer (131b and 132b) and a composition of the Ni plating layer (e.g., 131c1) as similar as possible on an interface between the alloy layer (131b and 132b) and the Ni plating layer (e.g., 131c1).

More preferably, the first metal element amount of the alloy layer (131b and 132b) may decrease gradually from the interface with the base electrode layer (131a and 132a) toward the interface with the Ni plating layer (e.g., 131c1), and the Ni amount of the alloy layer (131b and 132b) may increase from the interface with the base electrode layer (131a and 132a) toward the interface with the Ni plating layer (e.g., 131c1). As the first metal element amount and the Ni amount of the alloy layer (131b and 132b) continuously change, adhesion to the base electrode layer (131a and 132a) and the Ni plating layer (e.g., 131c1) may be further improved.

In an embodiment, the alloy layer (131b) may have the highest Sn amount on an interface between the first alloy layer (131b1) and the second alloy layer (131b2). Therefore, the adhesion may be further improved by making a composition of the first alloy layer (131b1) and a composition of the second alloy layer (131b2) as similar as possible on an interface between the first alloy layer (131b1) and the second alloy layer (131b2).

In an embodiment, an Sn amount of the alloy layer (131b) may increase from an interface with the base electrode layer (131a) to an interface between the first alloy layer (131b1), and may decrease from an interface between the first alloy layer (131b1) and the second alloy layer (131b2) toward an interface with the Ni plating layer (131c1). As the Sn amount of the alloy layer (131b) continuously changes, adhesion between the base electrode layer (131a) and the Ni plating layer (131c1) may be further improved.

A method of measuring an element amount of the first alloy layer (131b1) and an element amount of the second alloy layer (131b2) is not particularly limited. For example, after capturing an image, as illustrated in FIG. 6, of a cross-section of the multilayer electronic component 100 in the first and second directions from a center in the third direction with a scanning electron microscope (SEM) at a magnification of 20,000, a line profile may be performed in the image along a line L1 from a portion of the first base electrode layer to the Ni plating layer using SEM-EDS, to obtain a graph for element amounts as illustrated in FIG. 7, and the graph may be analyzed to measure an element amount of the first alloy layer and an element amount of the second alloy layer.

Figure 6:
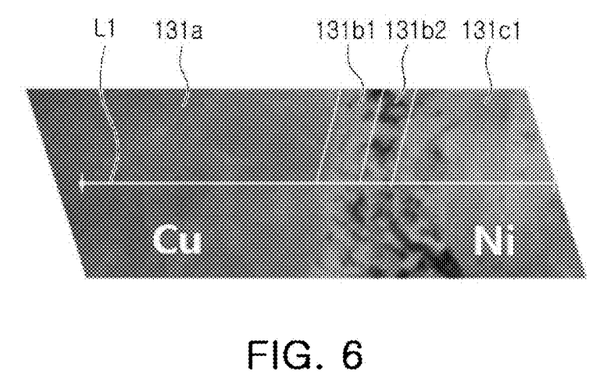
FIG. 6 is an image of a cross-section of an external electrode of a multilayer electronic component according to an embodiment of the present disclosure, scanned with a scanning electron microscope.
Figure 7:
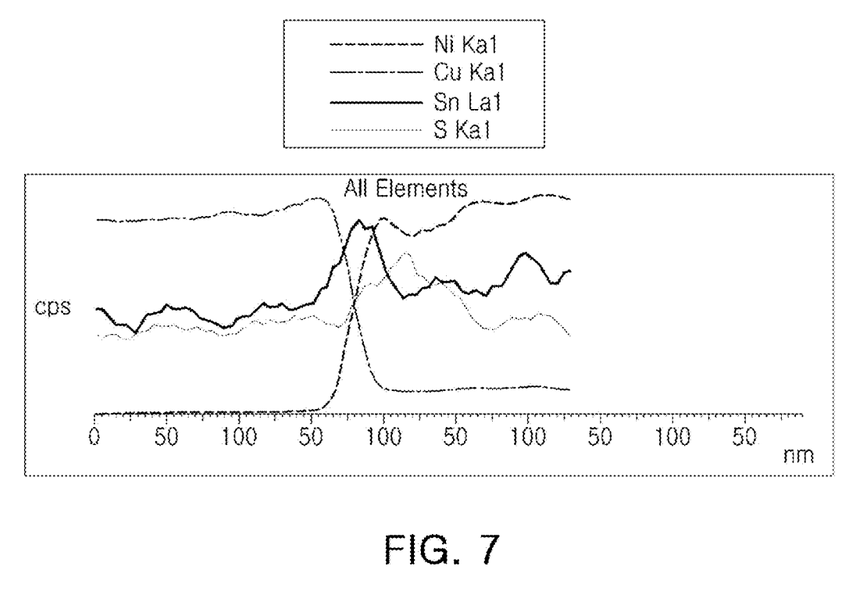
FIG. 7 is a graph obtained by performing a line profile along line L1 of FIG. 6 using SEM-EDS.

Referring to FIG. 6, it is possible to determine whether or not the alloy layers 131b1 and 131b2 are formed by SEM images, and referring to FIG. 7, the first alloy layer 131b1 and the second alloy layer 131b2 may be distinguished based on a point in which an Sn amount is highest in the alloy layer.

A method of forming the alloy layer (131b and 132b) is not particularly limited. For example, after forming a thin Sn layer on the base electrode layer (131a and 132a), an Ni plating layer may be formed on the Sn layer, and may be heat-treated, as a first element of the base electrode layer (131a and 132a) and an Sn layer of the Ni plating layer are diffused, the alloy layer (131b and 132b) may be formed.

In an embodiment, Sn included in the alloy layer (131b and 132b) may be provided as an alloy with at least one of the first metal element or Ni. For example, a layer formed of Sn may not be disposed in the alloy layer (131b and 132b), and Sn may be provided only as an alloy. When a layer formed of Sn is disposed in the alloy layer (131b and 132b), since the layer formed of Sn has a low hydrogen permeability, there may be a risk of deterioration of insulation resistance. When a layer formed of Sn is disposed in the alloy layer (131b and 132b), it may be difficult to remove residual hydrogen from the body due to the low hydrogen permeability of Sn. Therefore, in the alloy layer, Sn may be provided only as an alloy, and may be provided as an alloy with at least one of the first metal element or Ni.

Figure 8:
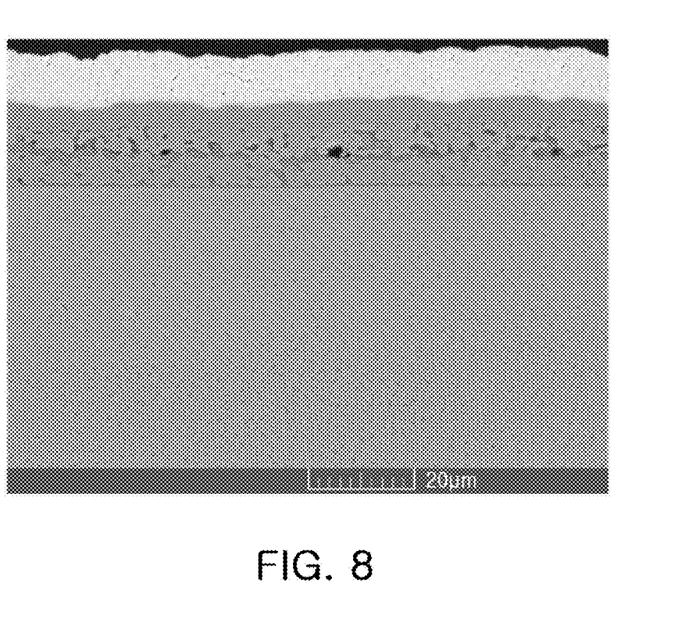
FIG. 8 is an image of a cross-section of an external electrode of an inventive example, scanned with a scanning electron microscope.
Figure 9:
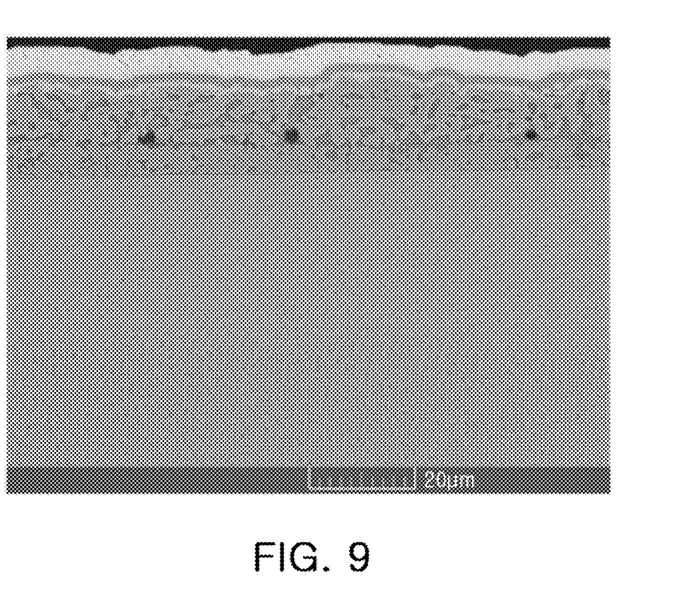
FIG. 9 is an image of a cross-section of an external electrode of a comparative example, scanned with a scanning electron microscope.

A sample chip for an inventive example in which a layer formed of Sn was not provided in an alloy layer (131b and 132b) and a sample chip for a comparative example in which a layer formed of Sn remains in an alloy layer were prepared, and then cross-sections of each of the sample chips were photographed with a scanning electron microscope. FIG. 8 is an image of a cross-section of an external electrode of an inventive example, scanned with a scanning electron microscope, and FIG. 9 is an image of a cross-section of an external electrode of a comparative example, scanned with a scanning electron microscope. Referring to FIG. 9, in a comparative example, it can be seen that a layer formed of Sn remains between an Ni plating layer and a base electrode layer, and a compositional difference on an interface between the Ni plating layer, the base electrode layer, and the layer formed of Sn may be clearly distinguished. Referring to FIG. 8, in an inventive example, it can be seen that a layer formed of Sn is not provided between an Ni plating layer and a base electrode layer. In an alloy layer, it can be confirmed by performing a line profile using SEM-EDS as illustrated in FIG. 7, after scanning at a high magnification as illustrated in FIG. 6.

After preparing forty (40) sample chips each of the inventive example and the comparative example, a voltage of 15V was applied for 20 hours at a temperature of 85° C. and a humidity of 85%, then insulation resistance was measured, and the number of sample chips corresponding to be less than 10^7Ω, 10^7 to 10^8Ω, and more than 10^8Ω was described.

TABLE 1

| Example | less than 10^7Ω | 10^7Ω to 10^8Ω | more than 10^8Ω |
|---|---|---|---|
| Inventive | 1 | 4 | 35 |
| Comparative | 6 | 21 | 13 |

It can be seen that the number of chips of which insulation resistance was measured to be less than 10^7Ω was only one (1) in the inventive example and six (6) in the comparative example, and a significant difference occurred in terms of moisture resistance reliability.

In addition, it can be seen that the number of chips measured with insulation resistance of 10^7Ω to 10^8Ω was twenty one (21) and IR Drop occurred in the majority of the sample chips in the comparative example, the number of chips measured with insulation resistance of 10^7Ω to 10^8Ω was four (4) and IR Drop did not occur in the majority of the sample chips in the inventive example, and a significant difference occurred in terms of moisture resistance reliability.

In addition, as a result of measuring a hydrogen amount in each of the sample chips of the inventive example and a hydrogen amount in each of the sample chips of the comparative example using a hydrogen analyzer, it was measured to be 7.8 wt ppm in the inventive example and 18.4 wt ppm in the comparative example. When a layer formed of Sn was disposed as in the comparative example, it can be confirmed that it is difficult to remove residual hydrogen in the body due to low hydrogen permeability of Sn.

An average thickness of an alloy layer (131b and 132b) does not need to be particularly limited. When the alloy layer (131b and 132b) is formed by heat-treating an Sn layer disposed between a base electrode layer (131a and 132a) and an Ni plating layer (e.g., 131c1), and the average thickness of the alloy layer (131b and 132b) exceeds 0.2 μm, there may be a possibility that the Sn layer remains in the alloy layer (131b and 132b). Therefore, since insulation resistance may be reduced, the average thickness of the alloy layer (131b and 132b) may be 0.2 μm or less. A lower limit of the average thickness of the alloy layer (131b and 132b) need not be particularly limited, but when the average thickness is less than 0.01 μm, effect of securing adhesion may be insufficient. Therefore, the average thickness may be 0.01 μm or more.

In addition, referring to FIG. 5, if the average thickness of the first alloy layer (131b1) is referred to as tb1 and the average thickness of the second alloy layer (131b2) is referred to as tb2, tb1 and tb2 may be 0.1 μm or less, respectively. The average thickness of the alloy layer (131b and 132b) may be the sum of tb1 and tb2.

tb1 and tb2 may be measured by capturing an image of a cross-section of the multilayer electronic component 100 in the first and second directions from a center in the third direction with a scanning electron microscope (SEM) at a magnification of 20,000. More specifically, an average value may be measured by measuring a thickness of the first alloy layer and a thickness of the second alloy layer at a plurality of points of the alloy layer (131b and 132b), for example, at ten (10) points equally spaced in the first direction. The ten (10) equally spaced points may be designated in a central portion of the external electrode in the first direction.

The base electrode layer (131a and 132a) may be formed using any material as long as they have electrical conductivity, such as metal or the like, and a specific material may be determined in consideration of electrical characteristics, structural stability, or the like, and may further have a multilayer structure.

For example, the base electrode layer (131a and 132a) may be a firing electrode containing a first metal element and glass, or may be a resin-based electrode containing the first metal element and a resin.

In addition, the base electrode layer (131a and 132a) may have a configuration in which the firing electrode and the resin-based electrode are sequentially formed on a body. In addition, the base electrode layer (131a and 132a) may be formed by transferring a sheet containing a conductive metal onto the body or by transferring a sheet containing a conductive metal onto the firing electrode.

A material having excellent electrical conductivity may be used as the first metal element included in the base electrode layer (131a and 132a), and is not particularly limited. Since it is difficult to implement an alloy layer according to an embodiment of the present disclosure when the first metal element is Ni and Sn, the first metal element may be at least one metal element, other than Ni and Sn. As a preferred example, the first metal element may be at least one of Cu or Ag. Since an alloy with Sn is easily formed when the first metal element is at least one of Cu or Ag, it may be easy to secure the alloy layer according to the present disclosure.

The plating layer (131b and 132b) may include an additional plating layer (e.g., 131c2) disposed on the Ni plating layer (e.g., 131c1) to improve mounting characteristics.

A type of the additional plating layer (131c2) is not particularly limited, and may be a plating layer containing at least one of Sn, Pd, or an alloy thereof, and may be formed as a plurality of layers. When the multilayer electronic component 100 is mounted on a substrate using a solder, the additional plating layer (131c2) may be an Sn plating layer. When the multilayer electronic component 100 is mounted on a substrate using a conductive adhesive, the additional plating layer (131c2) may be a Pd plating layer.

The present disclosure is not limited by the above-described embodiments and accompanying drawings, but is intended to be limited by the appended claims. Therefore, various forms of substitution, modification, and change will be possible by those skilled in the art within the scope of the technical spirit of the present disclosure described in the claims, and this will also be said to fall within the scope of the present disclosure.

In addition, the expression 'an embodiment' does not indicate the same embodiment, and is provided to emphasize and describe different unique characteristics. an embodiment presented above is not excluded from being implemented in combination with features of another embodiment. For example, even if a matter described in one detailed embodiment is not described in another embodiment, and it can be understood as a description related to another embodiment, unless there is a description contradicting or contradicting the matter in another embodiment.

Terms used in this disclosure may be only used to describe an embodiment, and may not be intended to limit the disclosure. In this case, singular expressions include plural expressions unless the context clearly indicates otherwise.

As one effect of various effects of the present disclosure, an alloy layer may be disposed between a base electrode layer and an Ni plating layer, to improve adhesion between the base electrode layer and the Ni plating layer.

Various advantages and effects of the present disclosure are not limited to the above description, and will be more easily understood in the process of describing specific embodiments of the present disclosure.

While example embodiments have been illustrated and described above, it will be apparent to those skilled in the art that modifications and variations could be made without departing from the scope of the present disclosure as defined by the appended claims.

What is claimed is:

1. A multilayer electronic component comprising:
   a body including a dielectric layer and an internal electrode; and
   an external electrode including a base electrode layer disposed on the body and including a first metal element, and an alloy layer and a plating layer, sequentially disposed on the base electrode layer,
   wherein the alloy layer includes a first alloy layer disposed to contact the base electrode layer and including an alloy of the first metal element and Sn, and a second alloy layer disposed to contact the first alloy layer and including an alloy of Ni and Sn, and
   the plating layer includes an Ni plating layer disposed to contact the second alloy layer.

2. The multilayer electronic component of claim 1, wherein the alloy layer has the highest Sn amount on an interface between the first alloy layer and the second alloy layer.

3. The multilayer electronic component of claim 1, wherein a first metal element amount of the first alloy layer is highest on an interface with the base electrode layer, and is lowest on an interface with the second alloy layer.

4. The multilayer electronic component of claim 1, wherein a first metal element amount of the first alloy layer decreases from an interface with the base electrode layer toward an interface with the second alloy layer.

5. The multilayer electronic component of claim 1, wherein a Ni amount of the second alloy layer is highest on an interface with the Ni plating layer, and is lowest on an interface with the first alloy layer.

6. The multilayer electronic component of claim 1, wherein a Ni amount of the second alloy layer decreases from an interface with the Ni plating layer toward an interface with the first alloy layer.

7. The multilayer electronic component of claim 1, wherein a first metal element amount of the alloy layer is highest on an interface with the base electrode layer, and is lowest on an interface with the Ni plating layer, and
   a Ni amount of the alloy layer is lowest on an interface with the base electrode layer, and is highest on an interface with the Ni plating layer.

8. The multilayer electronic component of claim 1, wherein a first metal element amount of the alloy layer decreases from an interface with the base electrode layer toward an interface with the Ni plating layer, and
   a Ni amount of the alloy layer increases from an interface with the base electrode layer toward an interface with the Ni plating layer.

9. The multilayer electronic component of claim 8, wherein a Sn amount of the alloy layer increases from an interface with the base electrode layer toward an interface between the first alloy layer and the second alloy layer, and decreases from an interface between the first alloy layer and the second alloy layer toward an interface with the Ni plating layer.

10. The multilayer electronic component of claim 1, wherein Sn included in the alloy layer is provided as an alloy with at least one of the first metal element or Ni.

11. The multilayer electronic component of claim 1, wherein an average thickness of the alloy layer is 0.2 µm or less.

12. The multilayer electronic component of claim 1, wherein an average thickness of the first alloy layer and an average thickness of the second alloy layer are 0.1 µm or less, respectively.

13. The multilayer electronic component of claim 1, wherein the first metal element is at least one of metal elements other than Ni and Sn.

14. The multilayer electronic component of claim 1, wherein the first metal element is at least one of Cu or Ag.

15. The multilayer electronic component of claim 1, wherein the plating layer further comprises a Sn plating layer disposed on the Ni plating layer.

16. A multilayer electronic component comprising:
    a body including a dielectric layer and an internal electrode; and
    an external electrode including a base electrode layer disposed on the body and including a first metal element, and an alloy layer and a Ni plating layer, sequentially disposed on the base electrode layer,
    wherein the alloy layer includes an alloy of the first metal element, Sn, and Ti, and
    an average thickness of the alloy layer is 0.2 µm or less.

17. The multilayer electronic component of claim 16, the average thickness of the alloy layer is 0.01 µm or more.

18. The multilayer electronic component of claim 16, wherein the alloy layer has the highest Sn amount in a region away from the Ni plating layer and the base electrode layer.

19. The multilayer electronic component of claim 16, wherein the alloy layer has the highest first metal element amount on an interface with the base electrode layer and has the lowest first metal element amount on an interface with the nickel layer.

20. The multilayer electronic component of claim 16, wherein a first metal element amount in the alloy layer decreases from an interface with the base electrode layer toward an interface with the Ni plating layer.

21. The multilayer electronic component of claim 16, wherein the alloy layer has the highest Ni amount on an interface with the Ni plating layer and has the lowest Ni amount on an interface with the base electrode layer.

22. The multilayer electronic component of claim 16, wherein a Ni amount in the alloy layer increases from an interface with the base electrode layer toward an interface with the Ni plating layer.

23. The multilayer electronic component of claim 16, wherein the first metal element includes at least one of Cu or Ag.

24. The multilayer electronic component of claim 16, wherein the alloy layer is in contact with the Ni plating layer and the base electrode layer.

25. The multilayer electronic component of claim 16, wherein the external electrode layer further comprises a Sn plating layer disposed on the Ni plating layer.

* * * * *